April 6, 1971     H. T. FINDLAY ET AL     3,573,957

PROCESS FOR PREPARING POROUS INK CONTAINING TRANSFER MEDIUM

Filed Aug. 5, 1968

INVENTORS.
HUGH T. FINDLAY
ROSZELL MACK, JR.

BY *David M. Bunnell*

ATTORNEY.

United States Patent Office 3,573,957
Patented Apr. 6, 1971

3,573,957
PROCESS FOR PREPARING POROUS INK
CONTAINING TRANSFER MEDIUM
Hugh T. Findlay and Roszell Mack, Jr., Lexington, Ky.,
assignors to International Business Machines Corporation, Armonk, N.Y.
Filed Aug. 5, 1968, Ser. No. 750,317
Int. Cl. B41m 5/10
U.S. Cl. 117—36.1    2 Claims

ABSTRACT OF THE DISCLOSURE

A porous, ink containing transfer medium is prepared by coating the surface of a polymer film, such as a polyamide, with a pore forming agent, such as ammonium bicarbonate, contained in a solvent such as ethanol, which is at least a partial solvent for the polymer film, to impregnate a portion of the pore forming agent into the surface of the polymer film. The solvent is removed and the film is heated to cause the pore forming agent to vaporize and form an open pored capillary structure in the surface of the film. The marking material can be incorporated either with the pore forming either with the pore forming agent or after the open pored capillary structue has been formed.

BACKGROUND OF THE INVENTION

Porous, ink containing polymer matrix transfer media are known which when subjected to pressure result in the forcing of some of the ink from the pores of the polymer matrix onto a copy sheet. Transfer media of this type have been produced which give excellent results both as to writing qualities, and reuseability. The transfer media usually have a filler material incorporated therein to produce a dry ribbon surface, add firmness to the ribbon, and control the emission of the ink under pressure or impact. However, the presence of this filler material detracts somewhat from the innate property of the polymer to resist the destructive cutting and embossing tendency of the type die on impact. The presence of the amount of ink necessary to give good write quality also tends to weaken the polymer matrix layer.

BRIEF DESCRIPTION

A porous transfer media has now been found which maintains the innate strength and cut resistance of the polymer film by reducing the amount of ink required and by eliminating the use of filler material.

In accordance with this invention, a porous ink transfer medium is produced by preparing the surface of a polymer film with a pore forming agent in a manner such that the pore forming agent is impregnated into the surface of the film. The pore forming agent is caused to vaporize to produce an open pored capillary structure in the surface of the film. The capillaries are filled with a marking material to porduce the transfer medium.

A porous ink transfer medium results having a strong, almost pure, solid polymer layer on the side which is subjected to impact and open-pored capillary structure which contains the marking material on the side which contacts the copy sheet.

DETAIL DESCRIPTION

Figure 1:
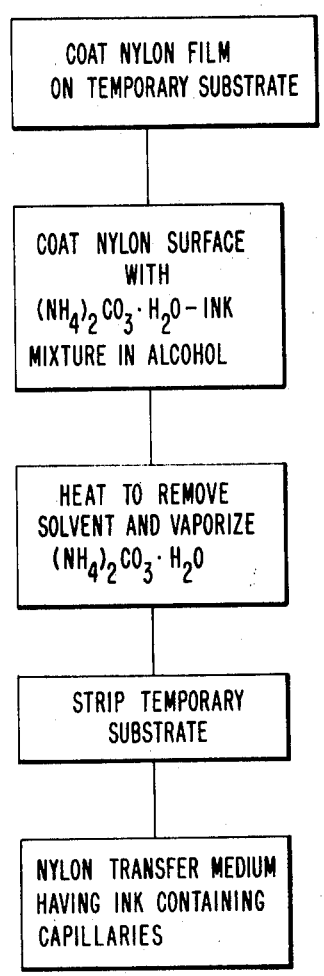
FIG. 1 is a flow diagram illustrating an embodiment of the process of the invention.

A variety of polymer films can be used as the polymer layer. Suitable materials include, for example, polyamide, polyurethane, polyester, polycarbonate, polybutylene, ethylene acetate copolymer, etc. The films can be formed by conventional methods such as being cast from a volatile dispersant or by extrusion. The solid films are formed in a thickness according to the end use of the transfer media, such as either carbon papers or typewriter ribbons. Suitable calipers generally range from about 0.0005" to 0.0025" in thickness.

Optionally, the polymer film can be supported on a temporary substrate during the manufacture of the transfer media. Suitable substrates for example, include glassine paper, polyethylene glycol terephthalate, polypropylene, polyethylene, release papers, etc. which can be easily stripped from the polymer film to produce the self-supported writing element.

Suitable pore forming agents are normally stable, solid or liquid materials which will produce vapors when subjected to heat and combinations of materials which will chemically react to produce vapors. Examples of such pore forming materials include alkali and alkaline earth, carbonates and bicarbonates such as ammonium bicarbonate and sodium carbonate; aluminum sulfate; camphor; pine oil; turpentine and butyl acetate; etc. The materials must be substantially incompatible with the polymer film. Otherwise, the film is solublized by the pore forming agent and a porous structure is not obtained.

The pore forming materials conveniently can be impregnated into the surface of the polymer film by coating the pore forming material either dispersed or dissolved in a volatile solvent by conventional methods onto the film surface and evaporating the solvent. The solvent is chosen such that it is at least a partial solvent for the polymer film so that it carries the solid or liquid pore forming agent into the body of the film.

Suitable solvents include, for example, ethanol, ethyl acetate, methylene chloride, etc. Mixtures of solvents can also be used. The particular solvent or solvent combination is chosen with respect to the polymer film, for example, ethanol is a good solvent to use with both polyamides such as nylon and solvent soluble polyurethane. Methylene chloride is a good solvent to use with polycarbonates and polybutylene. The solvent can be evaporated either at ambient temperature or at elevated temperatures up to about 250° F. so as to cause sufficient dissolution of the surface of the polymer film so that the pore forming agent becomes embedded into the body of the film as the solvent is evaporated. The solvent must be chosen so that it is more volatile than the pore forming agent so that the solvent can be evaporated prior to the vaporization of the bulk of the pore forming agent. Concentrations of pore formers in solvent of about 15% to 30% by weight are conveniently employed but can reach proportions of 1:1 or higher.

The pore forming agent is coated onto the surface of the polymer film in a sufficient amount to produce a final dry caliper of polymer film between about 0.0010" to about 0.0045" in thickness or about 30–50% free pore space. Pore formation occurs by the vaporization of the volatile solid or liquid, preferably by elevating the temperature. Temperatures up to about 300° F. have been found to be suitable to produce good pore formation with the temperature being chosen with respect to the vapor pressure of the particular pore former employed. Conveniently, the pore formation is carried out as a single step in conjunction with the removal of the solvent by heating after the solvent has been evaporated.

When the pore forming agents volatilize, the expanding vapors so formed produce voids in the heat softened plastic film as the vapors escape to the surface of the film thereby producing an open pored capillary structure in the surface of the film. A marking material such as a substantially non-volatile liquid ink is impregnated into the capillaries in the film by an convenient means.

The order of process steps in preparing the capillary structure and impregnating with ink has not been found to be critical thus providing convenient alternate ways of preparing the writing element. As described above, it has been found that the pore forming agent can be incorporated and the open-pored capillary structure prepared first. The capillaries are then impregnated with ink such as by forming a dispersion of the ink in a volatile solvent and then coating onto the porous surface by conventional coating techniques. Excellent results are also obtained when the ink and pore forming agent in a solvent are first mixed and then coated onto the polymer film together so that the pore formation and ink containing capillaries are produced in one step upon heating to remove the solvent and vaporize the pore forming agent.

Suitable inks are those conventionally employed in transfer media and comprise coloring material dispersed or dissolved in an oily ink vehicle.

Coloring materials include, for example, organic and inorganic dyes and pigments such as dye treated carbon black, nigrosine oleate, and organic dyestuffs such as methyl violet base.

Suitable ink vehicles include, for example, mineral oil, fatty acids, such as stearic and oleic acids and their esters with both polyethylene glycols, and fatty alcohols, for example, octyl ester of oleic acid.

Conventional dispersing agents can also be included to aid in dispersing the pigment in the vehicle.

A non-separating ink is conveniently produced by milling the above components in a roll mill until a fineness of grind measurement of a mil or less and preferably until the majority of the particles being 1/10 of a mil on the Hegmann Fineness of Grind guage is obtained.

The ink is then mixed, until homogenous, with a suitable volatile solvent which reduces its viscosity and aids in coating and impregnating the porous layer. Concentrations of ink and solvent of about 15 to 30% by weight give excellent results in coating and impregnating properties. Suitable solvents are conventional and should be chosen to avoid any excessive attack on the polymer film layer which might weaken or destroy the capillary structure. Suitable solvents include, for example, lower aliphatic hydrocarbons such as petroleum distillates, pentane, hexane, cyclohexane, etc., halogenated aliphatic hydrocarbons such as 1,1,1,-trichloroethane, and aromatic liquids as toluene or xylene.

The solvent and ink compositions are applied to the porous capillary surface of the polymer film in a sufficient amount to substantially fill the capillaries. Upon evaporation of the solvent at ambient or elevated temperatures up to about 300° F., the novel transfer medium is obtained and is ready for use upon removal of the temporary substrate, if any, and slitting or cutting to the desired size or shape, for example, typewriter ribbons or carbon paper.

FIG. 1 is a flow diagram illustrating the steps of an embodiment of the process described in detail above. The process and article of the invention are further illustrated by, but not intended to be limited to the following examples wherein parts are parts by weight unless otherwise indicated.

EXAMPLE 1

A dry polyamide film (Elvamide 8061 a product of Du Pont) having a thickness of 0.0015" was cast from a 20% by weight solution of the polyamide in denatured ethanol (Jaysol from Amsco solvents) onto a temporary substrate of polyethylene glycol terephthalate having a thickness of 2 mil. The coating was accomplished by using a reverse roll coater and the polyamide layer was dried by passing it through an air circulating oven at an air temperature of about 275° F. Two parts by weight of ammonium carbonate, $(NH_4)_2CO_3 \cdot H_2O$ were dispersed in eight parts of denatured ethanol (Jaysol) by ball milling the mixture for three hours at room temperature (about 25° C.). One part by weight of liquid ink was then dissolved in the ammonium carbonate-Jaysol solvent mixture by using a high speed mixer. The liquid ink is relatively non-volatile and incompatible with the polyamide polymer layer. The ink formulation is as follows:

| | Parts |
|---|---|
| Black pigment 1686 (Dye Specialties Company carbon black and dyestuff composition) | 6 |
| Black pigment 24516 (Paul Uhlich Company carbon black and dyestuff composition) | 10 |
| Nigrosine Oleate D.S. 2183 (Dye Specialties) | 63 |
| Methyl Violet Base (Du Pont, dyestuff) | 3 |
| Mixed octyl ester of oleic acid (Ophopex R9—Ohio Apex Company) | 18 |

The ink ingredients were thoroughly mixed prior to adding them to the pore forming-solvent mixture by milling the ingredients on a roll mill until the average particle size was about 1/10 of a mil. The solvent-ink-ammonium carbonate mixture was then applied to the surface of the polyamide film. The solvent was removed and the pore forming agent vaporized by heating the coated film in an air circulating oven at an air temperature of about 160° F. for 3 minutes. The dry transfer media when stripped from the temporary polyethylene glycol terephthalate substrate had a caliper of about 0.0025". The transfer media when cut to the size of a typewriter ribbon gave excellent write quality through 26 overstrikes without any cutting of the ribbon being observed by the impact of the type die.

Example 2

A 0.0025" thick dry polymer film was cast from an aqueous emulsion of polyurethane and water (P102A, a product of Wyandot Chemical Company) onto a temporary polyethylene glycol terephthalate substrate having a thickness of 1 mil. The coating was accomplished by using a reverse roll coater and the polymer layer was dried by passing it through an air circulating oven at an air temperature of 250° F. A solution of dl. camphor, 1 part by weight, in 1 part by weight of denatured ethanol containing 5% traces of ethyl acetate hexane and water (Jaysol product of Amsco Solvent) was coated onto the surface of the polyurethane film by a reverse roll coater. The solvent was removed by heating in an air circulating oven at an air temperature of about 250° F. for approximately 2 minutes which caused the camphor to be carried into the body of the film. After removal of the solvent the camphor was evaporated by heating at about 250° F. for an additional 3 minutes. A film with open surface pores resulted having a thickness of about 0.0035 inches. A substantially non-volatile, liquid ink mixture having the same formulation as that used in Example 1 was mixed in a proportion of one part by weight of ink to 3 parts by weight of the solvent, 1,1,1-trichloroethane, until a homogenous mixture was obtained. The solvent-ink mixture was applied to the porous surface of the polyurethane film by a reverse roll coating in a sufficient thickness to fill the capillaries of the polyurethane film being approximately 10 pounds per ream (500 sheets 20 x 30" or about 2,080 square feet of surface area). The solvent was removed by heating the ink coated polymer film in an air circulating oven at an air temperature of about 250° F. for approximately 2 minutes. The temporary polyethylene glycol terephthalate substrate was then stripped from the finished transfer element. A portion of the transfer layer so prepared was slit to provide a typewriter ribbon which when placed in the typewriter gave only a slight decline in print quality after 26 strikeovers on the same spot on the ribbon with no evidence of cutting having occurred.

Figure 2:
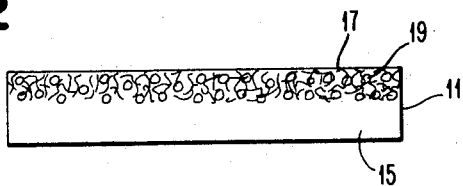
FIG. 2 is a cross sectional view of a novel transfer medium made in accordance with the process of the invention.

The transfer element 11 prepared by the process of Example 2 is illustrated in FIG. 2 and comprises a polyurethane layer having a solid continuous portion 15 on one side and a porous capillary structure 17 on the other, the capillaries being filled with ink 19 which is relatively non-volatile and incompatible with the polymer layer. The strength of the ribbon is achieved because of the solid portion 15 which is not weakened by the presence of ink or filler and therefore can withstand the cutting action of repeated typeblows. The capilliary structure 17 feeds ink at a uniform rate to the copy sheet upon impact or pressure by a type element and produces a clean surface without requiring the presence of a filler.

Example 3

A dry 0.0015 polymer layer of polyamide (Elvamide 8061 a product of Du Pont) was cast onto a temporary substrate of 2 mil thick Mylar polyethylene glycol terephthalate. A pore forming solvent mixture was formed comprising 2 parts by weight of pine oil, 1 part by weight of polyamide (Zytel 61 product of Du Pont) and 9 parts by weight of ethanol and coated onto the surface of the polyamide film using a reverse roll coater. The solvent was evaporated by heating in an air circulating oven at 250° F. for 2 minutes. The pine oil was then evaporated to form a capillary structure on the surface of the polyamide film which took approximately 2 minutes. The capillary surface was impregnated with the non-volatile ink solvent mixture used in Example 2 to fill the capillary structure with the ink after removal of the solvent by heating in an air oven at 240° F. for two minutes. The finished transfer media when stripped from the temporary substrate and cut to the size of a typewriter ribbon gave excellent print quality and no evidence of cutting after 26 overstrikes on the same portion of the ribbon.

Example 4

A 2 mil coating of polybutylene was extruded onto a temporary substrate layer of glassine paper. A pore forming solution comprising 4 parts by weight butyl acetate and 1 part by weight of methylene chloride was coated onto the polybutylene layer in a thickness of approximately 3 mils wet at a temperature of 100° F. The coating was dried to remove the methylene chloride solvent and then vaporize the pore forming butyl acetate by heating in an air circulating oven for 3 minutes at 140° F. The resulting film had a high degree of opacity. Opacity observed can be used to determine the optimum conditions of time and temperature for pore formulation to produce the maximum amount of pore space which in this case resulted in a 1 mil increase in the thickness of the polymer layer for a dry caliper of 3 mil. The surface of the film was impregnated with a solution of 1 part liquid ink having the formula formulation of Example 1 in 1 part by weight of ethanol and applying the ink and solvent to the porous polybutylene surface in an amount of 20 pounds per ream after which the ethanol solvent was removed by heating in an air circulating oven at a temperature of 220° F. for 3 minutes giving a liquid ink content of about 10 pounds per ream.

While the invention has been particularly shown and described with reference to preferred embodiments thereof it will be understood by those skilled in the art that the foregoing and other changes in form and details may be made therein without departing from the spirit and scope of the invention.

We claim:

1. A process for preparing a porous ink transfer media comprising coating the surface of a polymer film with a pore forming agent which forms expanding vapors, the pore forming agent contained in a solvent which is at least a partial solvent for said polymer film and evaporating said solvent to impregnate the pore forming agent into the surface of the film, heating to soften the polymer film and to evaporate the pore forming agent to form expanding vapors which create an open pored capillary structure in the polymer film of sufficient depth to contain liquid transfer material and then impregnating the capillaries so formed with a liquid transfer material to form said transfer media.

2. A process for preparing a porous ink transfer medium comprising coating the surface of a polymer film with a mixture of a pore forming agent which forms expanding vapors and a relatively non-volatile liquid transfer marking material contained in a solvent which is a partial solvent for the polymer film and heating to remove the solvent, soften the polymer film and cause the pore forming agent to vaporize and form expanding vapors thereby creating an open pored capillary polymer film surface of sufficient depth to contain said transfer marking material in the capillaries.

References Cited

UNITED STATES PATENTS

| | | | |
|---|---|---|---|
| 2,790,727 | 4/1957 | Hilborn | 117—63 |
| 3,037,879 | 6/1962 | Newman et al. | 117—36.1 |
| 3,102,824 | 9/1963 | Newman | 117—36.1 |
| 3,135,622 | 6/1964 | Ranalli | 117—63 |
| 3,392,042 | 7/1968 | Findlay et al. | 117—36.1 |
| 3,471,360 | 10/1969 | Newman | 117—36.1 |
| 3,484,268 | 12/1969 | Newman | 117—36.1 |

MURRAY KATZ, Primary Examiner

U.S. Cl. X.R.

117—47, 63, 138.8